United States Patent

Thill

[11] Patent Number: 6,014,844
[45] Date of Patent: Jan. 18, 2000

[54] WEDGED DRAFT PAD

[75] Inventor: Gregory J. Thill, Dubuque, Iowa

[73] Assignee: Rite-Hite Holding Corporation, Milwaukee, Wis.

[21] Appl. No.: 09/158,673

[22] Filed: Sep. 22, 1998

[51] Int. Cl.[7] .................................................. E04F 10/00
[52] U.S. Cl. .................................... 52/173.2; 52/DIG. 13
[58] Field of Search .................................. 52/2.12, 173.2, 52/DIG. 13

[56] References Cited

U.S. PATENT DOCUMENTS

| | | | |
|---|---|---|---|
| 3,500,599 | 3/1970 | Sciolino | 52/173.2 |
| 3,792,559 | 2/1974 | Frommelt et al. | 52/173.2 |
| 4,885,881 | 12/1989 | Lenz | 52/173.2 |
| 5,442,825 | 8/1995 | Hahn et al. | 52/173.2 X |

Primary Examiner—Christopher T. Kent

[57] ABSTRACT

A compressible foam draft pad for use at a lower inner portion of dock shelter helps seal against the lower rear side of a truck of an appropriate height and bridges a gap between an exterior face of a building and a laterally extending member of the dock shelter. The draft pad is generally wedge-shaped and has a forward relief surface that leans away from the laterally extending member with a lower forward edge that abuts the laterally extending member. A rear relief surface can lean away from the building as well, and can have a lower rear edge of the draft pad sealingly abut the building. The relief surfaces can minimize wear, especially along the inside surface of the laterally extending member. The unique shape of the draft pad provides a ratio of the pad's weight to a distance between spaced apart mounting points that is sufficiently small to minimize sagging of the draft pad.

16 Claims, 5 Drawing Sheets

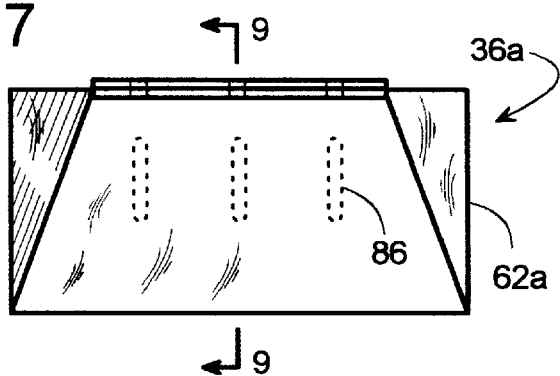
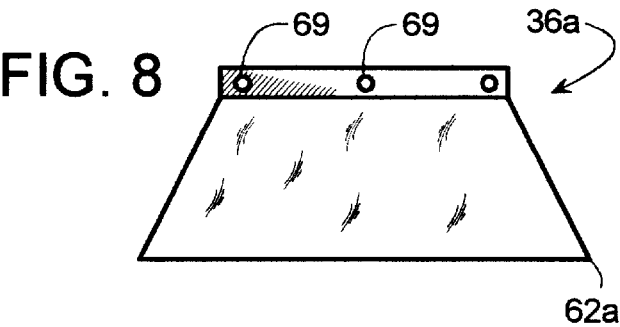
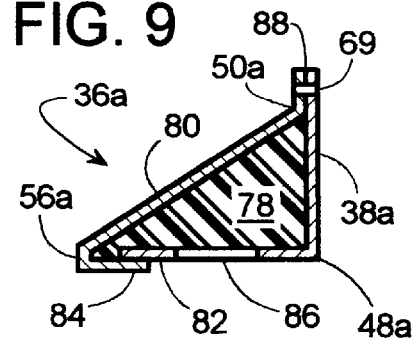
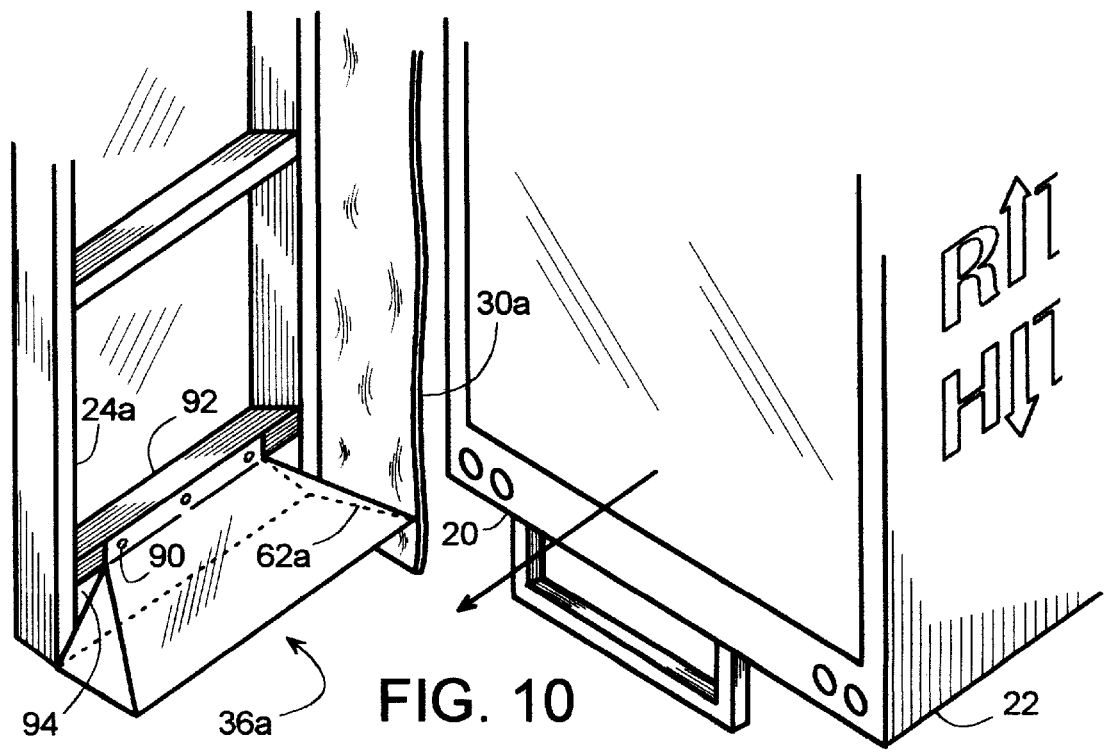

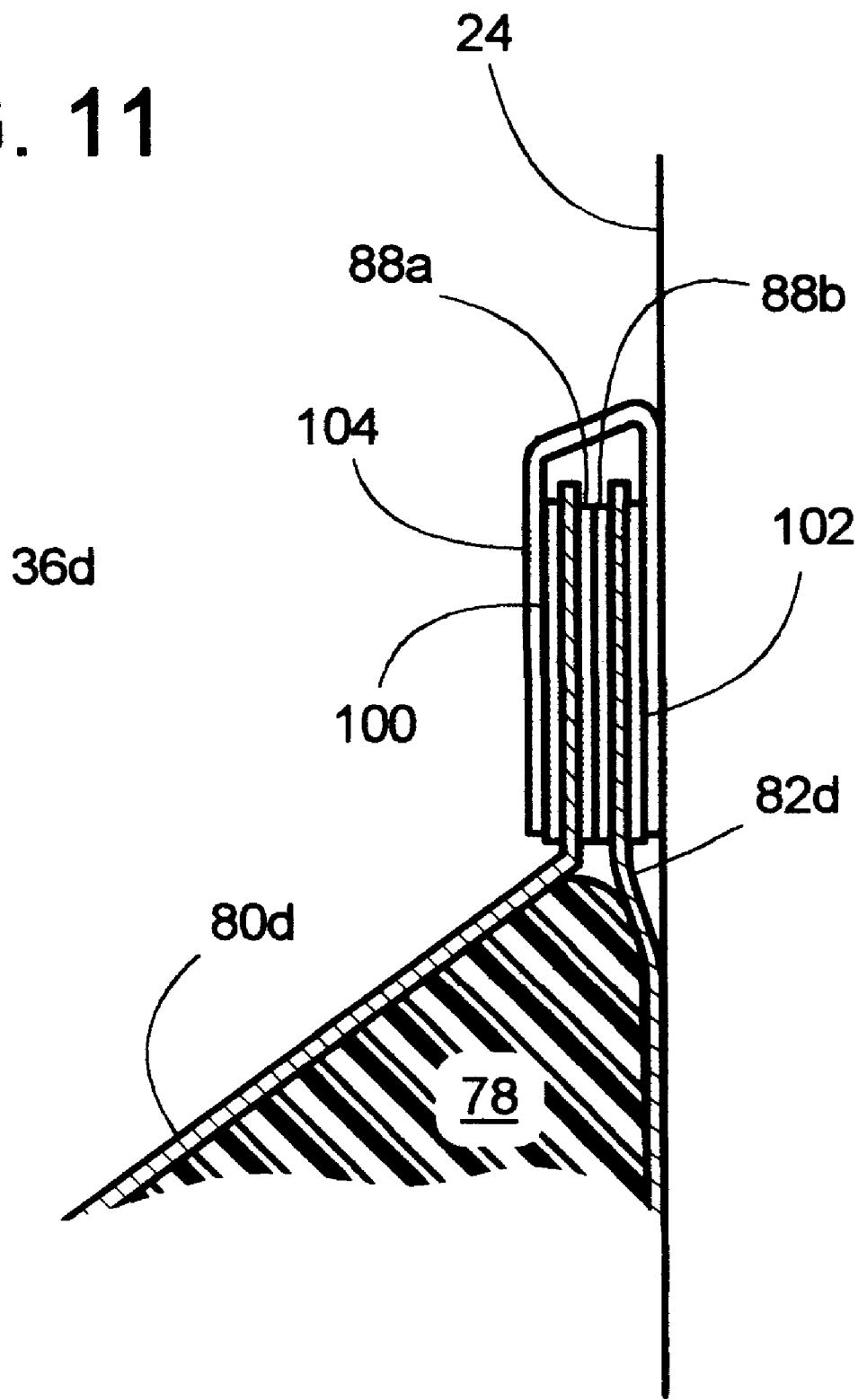

WEDGED DRAFT PAD

BACKGROUND OF THE INVENTION

1. Field Of The Invention

The subject invention generally pertains to loading dock shelters, and more specifically to a lower draft pad seal.

2. Description Of Related Art

When an exterior doorway of a building is used for loading and unloading trucks, the doorway may often include a dock shelter to help shield against the weather. The dock shelter seals off gaps that might otherwise exist between the exterior face of the building and the back end of the truck. Dock shelters often have projecting members that protrude outwardly from the face of the building and run generally along the top and lateral sides of the doorway. From a protruding edge of the projecting members, a top extending member and two laterally extending members may extend inward and generally parallel to the building face to help seal against the truck's top and sides, respectively. The laterally extending members are often made of a fabric or flexible foam. The rear bottom edge of the truck is often partially sealed off by a bumper pad or dock leveler. The remaining gaps are two inner bottom corners of the dock shelter at the lower back sides of the truck. These gaps are often partially sealed by draft pads attached to the lower ends of the projecting members.

For example, U.S. Pat. No. 4,885,881 (specifically incorporated by reference herein) discloses a pyramidal foam draft pad that hangs from a single point along an inner corner of a dock shelter. And U.S. Pat. No. 3,792,559 (specifically incorporated by reference herein) discloses a wedge-shaped pad. Both of these pads, however, have a generally full triangular surface that abuts the laterally extending member. This large contact area creates a significant compressive force against which the laterally extending member must deflect whenever a truck enters the dock shelter. Since laterally extending members are notorious for wear at this area of contact, it can be important to minimize the compressive forces here.

In the '559 patent, the draft pad has essentially a full triangular surface that abuts the building as well as the laterally extending member. This aggravates the wear problem at the laterally extending member, because a full contact area at both ends of the pad can increase the overall force required to compress the pad. Moreover, the higher compressive forces can be further transmitted to the projecting member, which thus needs to be reinforced accordingly (note the substantial size of backing member 39 of the '559 patent).

With pyramidal-shaped draft pads, its asymmetry means one may need right-hand and left-hand designs to seal dock shelters whose projecting members protrude farther from the building than its laterally extending member extend inward. Also, it can be desirable to have more sealing contact area between the draft pad and the projecting member than what is provided by a pyramidal design. Moreover, a single point attachment tends to allow pyramidal draft pads to sag more than pads having attachment that is more broadly distributed.

SUMMARY OF THE INVENTION

The subject invention is a novel draft pad for use generally at a lower inner portion of a dock shelter with the draft pad being generally situated between the exterior face of a building and a laterally extending member of the dock shelter. The draft pad has a forward relief surface that leans away from the laterally extending member, yet has a lower forward edge that abuts the laterally extending member. An optional feature of the invention would be to provide the draft pad with a rear relief surface that leans away from the building, yet has a lower rear edge that sealingly abuts the building.

With the subject invention, one may benefit from having reduced surface contact between the draft pad and the laterally extending member.

Another potential advantage would be a reduction in the force that is required to compress the draft pad, thereby possibly reducing wear and tear of the laterally extending member and draft pad.

In some applications, a draft pad having front-to-back symmetry to eliminate the need for separate right-hand and left-hand draft pads could be a benefit.

In some applications, a draft pad with multiple, spaced-apart mounting points for greater support and stability could be beneficial.

Another potential advantage of the invention is to have a mounting span to weight ratio that may improve a draft pad's ability to resist sagging.

BRIEF DESCRIPTION OF THE DRAWINGS

FIG. 7 is a top view of a second embodiment of the invention.

FIG. 8 is a front view of the second embodiment of the invention.

FIG. 9 is a sectional view taken along line 9—9 of FIG. 7.

FIG. 10 is a perspective view of the invention as viewed generally from inside a doorway looking out.

FIG. 11 is an end sectional view of another embodiment of the invention.

DESCRIPTION OF THE PREFERRED EMBODIMENT

Figure 1:
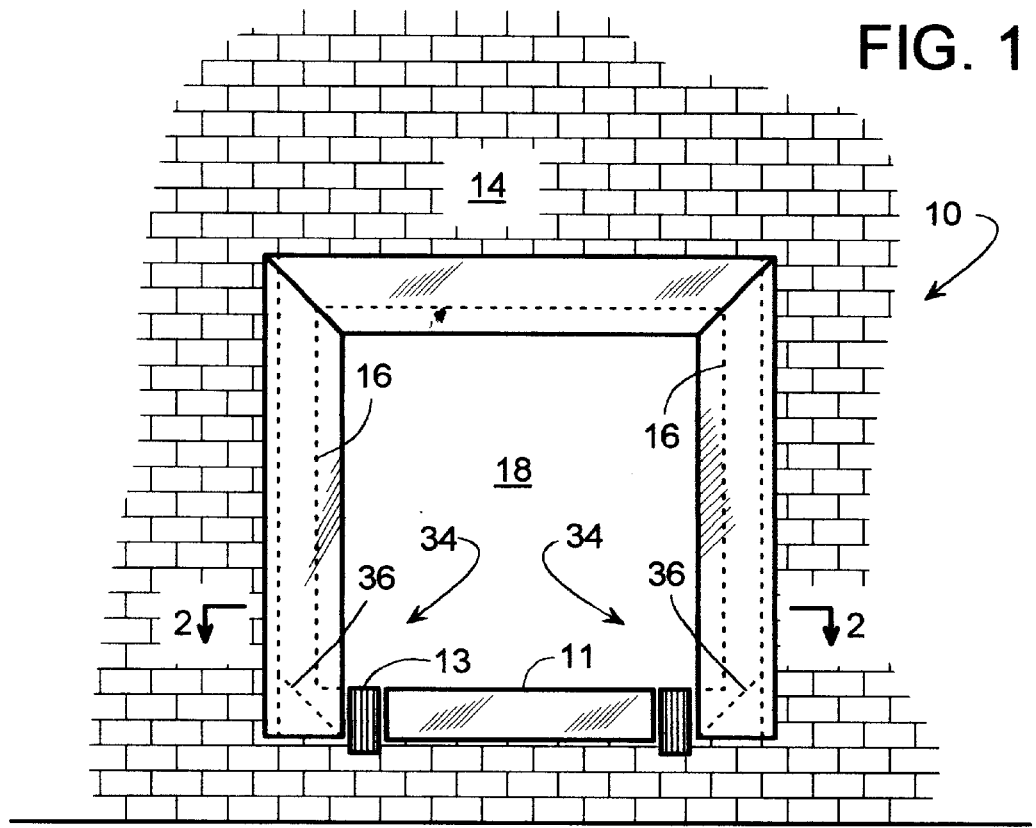
FIG. 1 is a front view of a dock shelter incorporating the subject invention.
Figure 2:
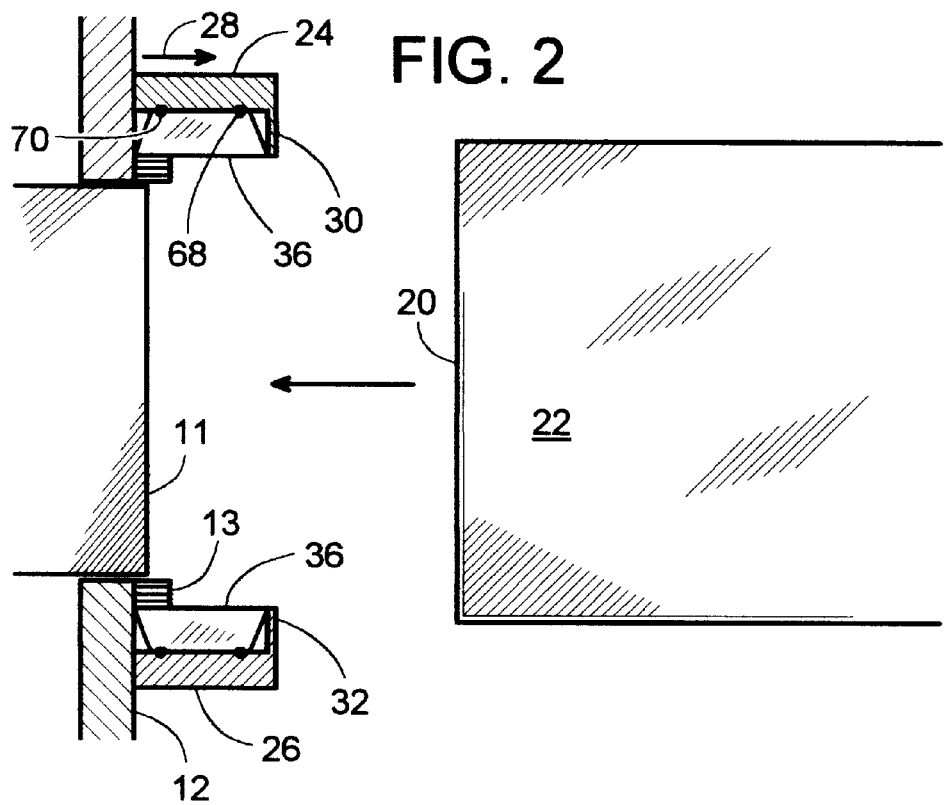
FIG. 2 is a sectional top view taken along lines 2—2 of FIG. 1 and shows a decompressed draft pad.
Figure 3:
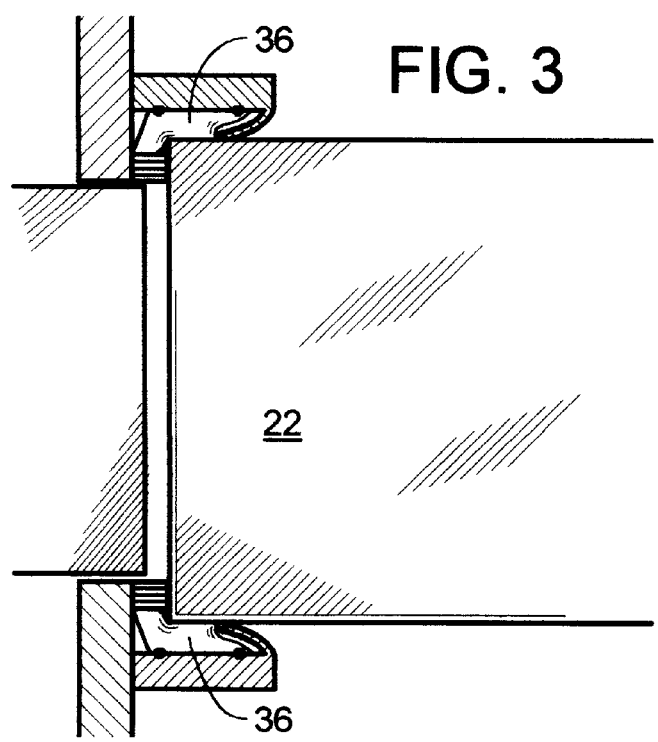
FIG. 3 is the same view as FIG. 2, but with a truck compressing the draft pad.

FIGS. 1, 2 and 3 show a dock shelter 10 attached to an exterior side 12 of a building 14. Building 10 includes a doorway 18 through which a truck 22 may load and unload.

Building 10 may also optionally include a dock leveler 11 and bumpers 13. Dock shelter 10 is situated generally along lateral edges 16 of doorway 18 to help seal a gap that may otherwise exist between doorway 18 and a back end 20 of truck 22. Dock shelter 10 has a right projecting member 24 and a left projecting member 26 that extend outward from building 14 in a forward direction 28. Both projecting members 24 and 26 have respective laterally extending members 30 and 32 that extend generally inward toward truck 22. As truck 22 backs into dock shelter 10, laterally extending members 30 and 32 can deflect, as shown in FIG. 3. Likewise, a resilient, preferably foam draft pad 36 is deflected or compressed to help minimize the amount that the back end 20 of truck 22 is exposed to the weather.

Projecting members 24 and 26 and laterally extending members 30 and 32 are schematically illustrated to represent a myriad of construction possibilities. Some examples include, but are not limited to, projecting members 24 and 26 being made of foam (compressible and resilient), wood, fabric, steel, and various combinations thereof The same is true for laterally extending members 30 and 32; however, best results have been achieved when laterally extending members 30 and 32 are made of foam or fabric to render laterally extending members 30 and 32 more flexible than projecting members 24 and 26. In one embodiment of the invention, projecting members 24 and 26 are each integrally joined as a unitary piece to their respective laterally extending members 30 and 32. Some specific examples of projecting members and their laterally extending members would include but not be limited to an L-PAD made of a compressible, resilient foam where projecting members 24 and 26 can each be integrally joined as a unitary piece to their respective laterally extending members 30 and 32; a model WG-402 dock shelter having wood-framed projecting members 24 and 26 with fabric laterally extending members 30 and 32; and ELIMINATOR having foam projecting members 24 and 26 with fabric laterally extending members 30 and 32; and a dock shelter whose projecting members 24 and 26 are normally rigid but are able to collapse without extensive permanent damage upon impact of a truck. The L-PAD, WG-402, and ELIMINATOR are products of Frommelt Products Corporation. With the above-mentioned examples, lower internal corners 34 of dock shelter 10 are each at least partially sealed off by a draft pad 36 preferably made of a compressible, resilient foam. Based on the foregoing, one of skill in the art will appreciate that the term "dock shelter" as used herein may encompass traditional dock shelters, certain dock seals, and "hybrid" products such as the ELIMINATOR sold by Frommelt Products Corporation.

Figure 4:
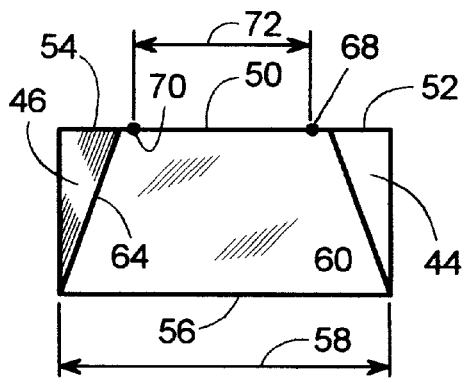
FIG. 4 is a top view of one embodiment of the invention.
Figure 5:
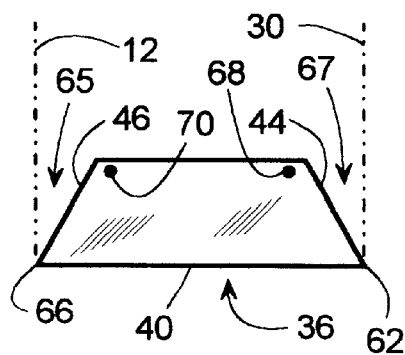
FIG. 5 is a front view of one embodiment of the invention.
Figure 6:
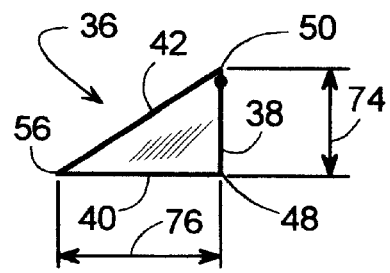
FIG. 6 is an end view of one embodiment of the invention.

Referring to an exemplary embodiment of the invention in FIGS. 4, 5 and 6, draft pad 36 includes a mounting surface 38 that can intersect a bottom surface 40, a top surface 42, a forward relief surface 44, and a rear relief surface 46 at a lower edge 48, and upper mounting edge 50, an outer forward edge 52, and an outer rear edge 54, respectively. Top surface 42 can intersect bottom surface 40 at a side edge 56 that may provide a sliding seal against the side of truck 22 as it backs into dock shelter 10 (provided that the side of truck 22 is at an appropriate height). The length of side edge 56 can be referred to as a side length 58. Forward relief surface 44 can intersect top surface 42 and bottom surface 40 at an upper forward edge 60 and a lower forward edge 62, respectively. Rear relief surface 46 can intersect top surface 42 and bottom surface 40 at an upper rear edge 64 and a lower rear edge 66, respectively.

With reference to the right side of dock shelter 10, draft pad 36 may be attached to projecting member 24 at a forward point of attachment 68 and a rear point of attachment 70 in one embodiment of the invention. Points 68 and 70 are generally along upper mounting edge 50 and can be spaced apart from each other by a distance referred to as a mounting distance 72. However, additional points of attachment can be added between points 68 and 70 for additional support and to minimize sagging of draft pad 36. In another embodiment, there can be a continuous line of attachment extending from point 68 to 70.

To further minimize sagging, the dimensions of draft pad 36 can be chosen to provide a favorable ratio of the draft pad's weight to its mounting distance 72. For example, good results may be achieved when the total decompressed volume of draft pad 36 is generally less than half the product of the pad's nominal height 74 times the pad's nominal width 76 times side length 58. Nominal height 74 is generally the distance between lower edge 48 and upper mounting edge 50. Nominal width 76 is the perpendicular distance from mounting surface 38 to side edge 56.

In one embodiment of the invention, a favorable weight to mounting distance ratio can be accomplished by having the forward and rear relief surfaces 44 and 46 lean toward each other. Forward relief surface 44 can lean away from laterally extending member 30 so that lower forward edge 62 is farther forward than most of surface 44. Lower forward edge 62 can separably abut laterally extending member 30 to at least partially seal out drafts, while most of surface 44 is spaced apart from laterally extending member 30 to not only minimize potential wear therebetween, but also to possibly minimize the extent to which truck 22 needs to compress draft pad 36. A similar principle applies to rear relief surface 46. Most of surface 46 can be farther forward than lower rear edge 66. Edge 66 can separably abut building 12, while rear relief surface 46 can lean away from building 12. Debris accumulating just above edges 62 and 66 (along wear relieving clearance 65 and 67) can possibly be cleared by deflecting draft pad 36 and laterally extending member 30, as edge 66 is preferably not rigidly fastened to building 12 and edge 62 is preferably not rigidly fastened to laterally extending member 30.

In the embodiment shown in FIGS. 7, 8 and 9, a draft pad 36a may include a compressible, resilient foam core 78, wrapped within a water repellent top cover 80 and a bottom cover 82. Top cover 80 could extend from upper mounting edge 50a to side edge 56a. Bottom cover 82 can be joined to top cover 80 at seam 84 and extend between side edge 56a and a lower edge 48a. In one embodiment of the invention, covers 80 and 82 extend farther to totally cover foam core 78. Top cover 80 is preferably made of a water-repellent material. Examples would include, but are not be limited to: canvas duck, rubber impregnated fabric, nylon, and HYPALON which is a registered trademark of DuPont. Bottom cover 82 preferably provides an air passage through itself to allow air to enter and leave foam core 78 as it is compressed and decompressed by truck 22. For the embodiment of FIGS. 7, 8 and 9, the air passage is provided by slits 86 through bottom cover 82. As an alternative; however, the air passage can be provided by having bottom cover 82 made of a porous material.

Covers 80 and 82 can be joined together at upper mounting edge 50a by way of a touch and hold fastener 88, such as VELCRO. Referring additionally to FIG. 10, mounting points 69 are optional holes that allow screws 90 to fasten draft pad 36a to a 2×4 horizontal cross bar 92 of a wood-framed projecting member 24a. Below cross bar 92 is an optional filler 94 that allows a mounting surface 38a to rest against projecting member 24a. Laterally extending member 30a, in this embodiment, is made of a flexible fabric that rests against a lower forward edge 62a of draft pad 36a.

In the embodiment of FIG. 11, draft pad 36d can be attached to a projecting member 24 by way of touch and hold strips 100, 102, and 104, which are sewn or attached by most any preferred method to top cover 80d, bottom cover 82d, and projecting member 24 respectively. Likewise, touch and hold strips 88a and 88b are sewn or otherwise attached to top cover 80a and bottom cover 82a. Strip 88a removably grips 88b, and strip 104 removably grips strips 100 and 102. Such a design facilitates removal and disassembly of draft pad 36d as well as provides a continuous line of attachment from a forward point of attachment to a rear point of attachment.

Figure 12:
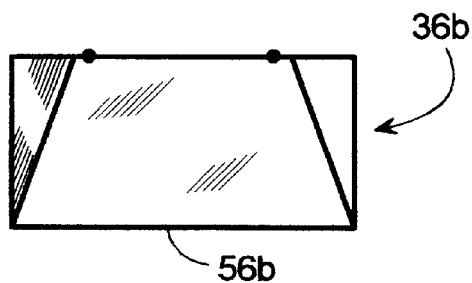
FIG. 12 is a top view of a third embodiment of the invention.
Figure 13:
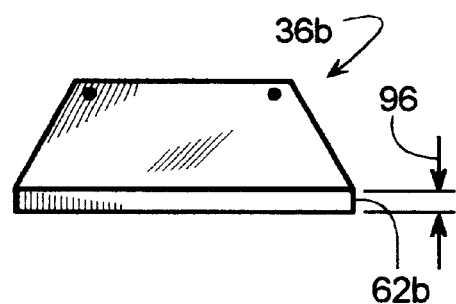
FIG. 13 is a front view of the third embodiment of the invention.
Figure 14:
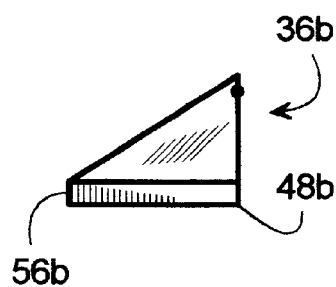
FIG. 14 is an end view of the third embodiment of the invention.

In another embodiment of the invention, illustrated in FIGS. 12, 13 and 14, a draft pad 36b includes a lower rear edge 48b, a side edge 56b, and a lower forward edge 62b, all of which have an appreciable dimension of height 96 rather than being substantially sharp. The term "appreciable dimension of height" used herein and below refers to an edge having its own surface with a height of at least one inch. The term "substantially sharp" used herein and below refers to an edge of less than one inch in height.

Figure 15:
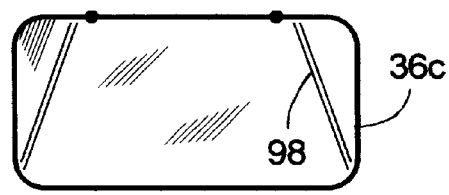
FIG. 15 is a top view of a fourth embodiment of the invention.
Figure 16:
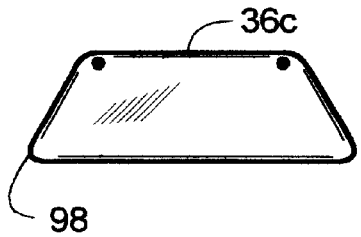
FIG. 16 is a front view of the fourth embodiment of the invention.
Figure 17:
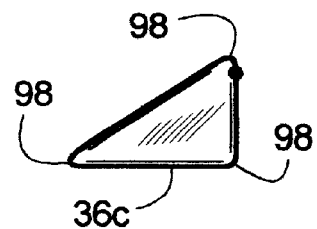
FIG. 17 is an end view of the fourth embodiment of the invention.

For the embodiment of FIGS. 15, 16 and 17, a foam draft pad 36c is shown to include edges that are slightly rounded as indicated by numeral 98. Although edges 98 are not perfectly sharp, they are still referred to as substantially sharp considering the physical characteristics of foam (especially when encased by a fabric cover).

It should be noted that the various surfaces of draft pads 36, 36a, 36b, 36c, and 36d are schematically illustrated so as to encompass not only surfaces that are flat, but also surfaces that are at least partially convex, concave, or irregular.

Although the invention is described with respect to a preferred embodiment, modifications thereto will be apparent to those skilled in the art. Therefore, the scope of the invention is to be determined by reference to the claims which follows

I claim:

1. A draft pad for a lower inner corner of a dock shelter, said dock shelter being on an exterior side of a building and disposed generally along lateral edges of a doorway to help seal a vertical gap that may otherwise exist between said doorway and a back end of a truck, said dock shelter including a projecting member that extends outward from said building in a forward direction, and a laterally extending member extending from the projecting member and pointed generally inward toward said truck, said draft pad comprising:
   a mounting surface defined by an upper mounting edge and a lower edge, said draft pad being attachable to the projecting member with said mounting surface facing the projecting member;
   a bottom surface extending from said lower edge;
   a top surface extending from said upper mounting edge, said top surface and said bottom surface being joined at a side edge; and
   a forward relief surface being joined to said bottom surface at a lower forward edge, said lower forward edge extending farther in said forward direction than most of said forward relief surface to provide a wear relieving clearance between said forward relief surface and said laterally extending member.

2. The draft pad as recited in claim 1, further comprising a rear relief surface being joined to said bottom surface at a lower rear edge, most of said rear relief surface being farther in said forward direction than said lower rear edge to provide an additional wear relieving clearance between said rear relief surface and said building.

3. The draft pad as recited in claim 1, wherein said upper mounting edge, said side edge, and said lower forward edge are substantially linear.

4. The draft pad as recited in claim 1, wherein said side edge and said lower forward edge both have an appreciable dimension of height as opposed to each being a substantially sharp edge.

5. The draft pad as recited in claim 2, wherein said lower rear edge abuts said building yet is separable therefrom by virtue of said draft pad being compressible, whereby an occasional collection of debris can escape by falling between said building and said lower rear edge upon compressing said draft pad away from said building.

6. The draft pad as recited in claim 1, wherein said lower forward edge abuts said laterally extending member yet is separable therefrom by virtue of said draft pad being compressible, whereby an occasional collection of debris can escape by falling between said laterally extending member and said lower forward edge upon compressing said draft pad away from said laterally extending member.

7. The draft pad as recited in claim 1, further comprising a top cover and a bottom cover wrapped about a compressible, resilient foam core, said top cover extending from said upper mounting edge to said side edge, said top cover being substantially water repellent, said bottom cover extending between said side edge and said lower edge, said bottom cover providing an air passage therethrough to allow air to enter and leave said compressible, resilient foam core.

8. The draft pad as recited in claim 7, further comprising a touch and hold fastener removably joining said top cover to said bottom cover along said upper mounting edge.

9. The draft pad as recited in claim 8, further comprising a second touch and hold fastener adapted to removably attach said upper mounting edge to said projecting member.

10. A draft pad for a lower inner corner of a dock shelter, said dock shelter being on an exterior side of a building and disposed generally along lateral edges of a doorway to help seal a vertical gap that may otherwise exist between said doorway and a back end of a truck, said dock shelter including a projecting member that extends outward from said building in a forward direction, and a laterally extending member extending from the projecting member and pointed generally inward toward said truck, said draft pad comprising:
   a compressible, resilient foam core having a decompressed volume and a weight;
   a mounting surface along one side of said compressible, resilient foam core, said mounting surface defined by a lower edge and an upper mounting edge, said lower edge being spaced apart from said upper mounting edge to define a nominal height of said draft pad, said upper mounting edge having a rear point of attachment and a forward point of attachment from which said draft pad is adapted to hang with said mounting surface facing said projecting member, said rear point of attachment being spaced apart a mounting distance from said forward point of attachment; and
   a top surface extending from said upper mounting edge and terminating at a side edge, said side edge having a horizontal length that defines a nominal length of said draft pad, said side edge being spaced apart from said mounting surface by a distance that defines a nominal width of said draft pad, said distance being measured in a direction substantially perpendicular to said mounting surface, said decompressed volume being less than half of said nominal height multiplied by said nominal length multiplied by said nominal width to provide a weight to mounting distance ratio that enhances an ability of said draft pad to resist sagging.

11. The draft pad as recited in claim 10, further comprising a forward relief surface having a lower forward edge adapted to abut an inner side of said projecting member, said forward relief surface having a first upper portion leaning away from said inner side.

12. The draft pad as recited in claim 10, further comprising a rear relief surface having a lower rear edge adapted to abut said exterior side of said building, said rear relief surface having a second upper portion leaning away from said exterior.

13. The draft pad as recited in claim 10, wherein said forward point of attachment and said rear point of attachment are at opposite ends of a plurality of discrete points of attachment.

14. The draft pad as recited in claim 10, wherein said forward point of attachment and said rear point of attachment are at opposite ends of a continuous line of attachment.

15. The draft pad as recited in claim 10, wherein said draft pad is substantially symmetrical from said forward relief surface to said rear relief surface.

16. A draft pad for a lower inner corner of a dock shelter, said dock shelter being on an exterior side of a building and disposed generally along lateral edges of a doorway to help seal a vertical gap that may otherwise exist between said doorway and a back end of a truck, said dock shelter including a projecting member that extends outward from said building in a forward direction, and a laterally extending member extending from the projecting member and pointed generally inward toward said truck, said draft pad comprising:

a mounting surface defined by an upper mounting edge and a lower edge, said draft pad being attachable to said projecting member at said upper mounting edge with said mounting surface disposable against said projecting member;

a bottom surface extending from said lower edge;

a top surface extending from said upper mounting edge, said top surface and said bottom surface being joined at a side edge;

a forward relief surface being joined to said bottom surface at a lower forward edge; and a rear relief surface being joined to said bottom surface at a lower rear edge, most of said rear relief surface being farther in said forward direction than said lower rear edge to provide a wear relieving clearance between said rear relief surface and said building, said lower forward edge extending farther in said forward direction that most of said forward relief surface to provide an additional wear relieving clearance between said forward relief surface and said laterally extending member.

\* \* \* \* \*